April 24, 1962 B. ONIKI 3,031,525

SIGNAL DISPLAY SYSTEMS

Filed Jan. 18, 1960

INVENTOR.
BEN ONIKI
BY Harvey G. Lowhurst
ATTORNEY

United States Patent Office 3,031,525

Patented Apr. 24, 1962

3,031,525
SIGNAL DISPLAY SYSTEMS

Ben Oniki, Redwood City, Calif., assignor to Ampex Corporation, Redwood City, Calif., a corporation of California Filed Jan. 18, 1960, Ser. No. 2,926
7 Claims. (Cl. 178—6.6)

Figures 1, 2:
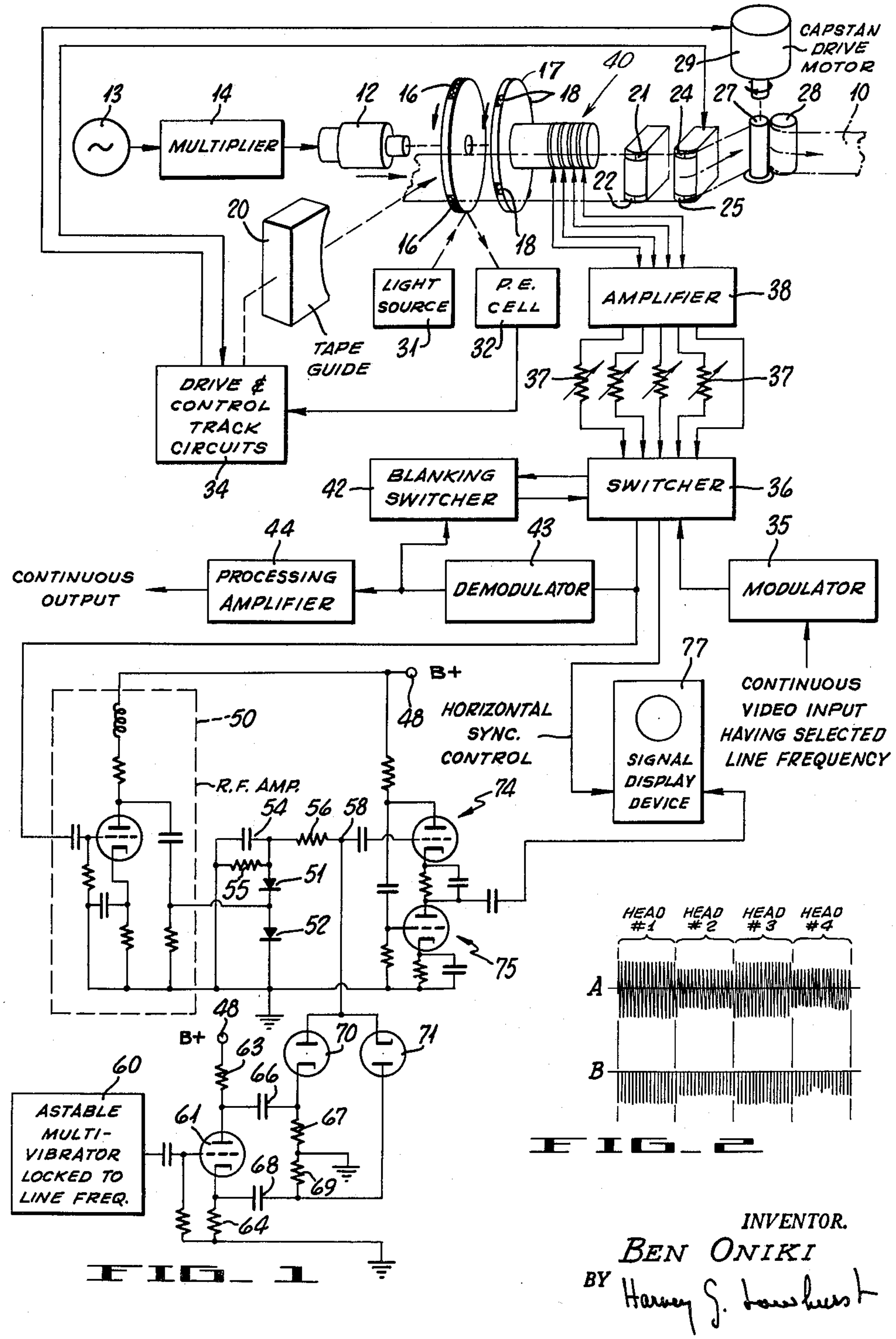

This invention relates to radio frequency signal display systems, and more particularly to a new and improved system and circuit for the concurrent display and comparison of radio frequency signals in several channels.

Magnetic tape systems have been developed which are capable of recording and reproducing signals over a wide frequency spectrum. A particularly versatile example of such systems is described in Patent No. 2,866,012. The system there shown includes a rotary assembly having several peripherally mounted magnetic transducer heads for sweeping across separate transverse tracks on a tape with the heads being spaced so that at least one head is adjacent the tape at all times. By means of control tracks along the margins of the tape, the rotation of the heads and the movement of the tape are synchronized and other elements of the system are coordinated so that an exact reproduction of the signals recorded along the transverse tracks of the tape is obtained. Magnetic tape recording systems employing the above described features are used widely for the recording and reproduction of television signals and programs.

For accurate reproduction of the signals recorded along transverse tracks on the tape, it is necessary to sequentially employ the signals which originate with each of the several magnetic heads during operation. By employing timed switching between the signal channels associated with each head, a substantially continuous output signal is formed from which a television picture may be reproduced with high fidelity. One suitable timed switching arrangement is described in the copending United States patent application, Serial No. 614,420, filed October 8, 1956, now Patent No. 2,968,692.

One difficulty arising in the above described magnetic recording systems is that the operation of the magnetic heads in the rotary assembly may not be uniform. Thus, the response of each of the magnetic heads may differ somewhat with respect to the others so that the signals derived by each of the heads require amplitude equalization. The gain and the characteristics of the associated pre-amplifiers and amplifiers for receiving signals from the heads may also differ with respect to one another. It is desirable to be able to display these differences so that equalization may be readily accomplished. If this is not done, a television picture, for example, may be subject to a "banding" effect in which groups of horizontal scan lines are visibly different from other horizontal lines upon reproduction. It has heretofore been difficult, however, to provide a suitable and stable display of the signals derived from the individual signal channels from which the continuous output signal is derived. Since the signals are of radio frequency, transients may be excited within the magnetic recording system and throughout the display circuitry unless special and expensive precautions are taken. In addition, there is often difficulty in maintaining a steady display of the reproduced signals. Because of certain frequency characteristics, such as the line frequency of television signals, the display tends to shift with time, and an accurate comparison of signal amplitudes cannot readily be made.

It is therefore an object of the present invention to provide an improved display system for indicating the presence and relative amplitudes of signals in several radio frequency channels which are united to form a substantially continuous signal.

It is another object of the present invention to provide a system for displaying the amplitude of radio frequency signals in which the signals are isolated from the display area itself.

It is a further object of the present invention to provide an improved magnetic recording and reproducing system using a rotary head assembly to provide equalized amplitude signals in the channels which are coupled to the different heads of the assembly.

Yet another object of this invention is to provide an improved display of the relative amplitudes of frequency modulated television signals having a selected line frequency where the signals are derived from separate signal channels.

A display system in accordance with the invention may operate with a frequency modulated wave provided as a substantially continuous output signal derived from a separate signal channel associated with the type of magnetic tape reproducer utilizing a rotary head assembly. The frequency modulation of the wave may represent television signals having a selected line frequency. However amplitude variations in the wave are attributable to different characteristics of the separate signal channels and heads of the rotary assembly. By applying the wave to a detector circuit, a rectified signal is provided having a magnitude corresponding to the amplitude characteristics of the frequency modulated signal in the signal channel then being utilized. A synchronizing signal component may be inserted in the rectified signal at the line frequency, and the signal thus generated may then be carried to display circuitry to provide a steady display of the relative amplitudes of the signals in the signal channels without the introduction of R.F. transients in the display circuitry.

A better understanding of the invention, and the manner of its operation, may be had by reference to the following description, taken in conjunction with the accompanying drawing, in which:

FIGURE 1 is a combined simplified perspective, block diagram and schematic diagram representation of a signal display system in accordance with the invention, and FIGURE 2 is a representation of various waveforms provided by a system in accordance with the invention.

Referring to FIGURE 1, there is shown a magnetic recording and reproducing system utilizing a rotary head assembly for wide band recording and reproduction, as for television signals. A magnetic tape 10 moves past the transducer units of the assembly, the tape 10 being shown principally in phantom in order to permit the associated elements to be depicted more clearly. The tape transport mechanism for the tape 10 may be similar to conventional high quality professional recorders, and therefore has not been shown in detail.

In the present arrangement, the tape 10 moves in from the left side to the right side of the drawing between a feed reel and a take-up reel which are not shown. The principal parts of the rotary head assembly are mounted on a shaft which is driven by a synchronous motor 12. The synchronous motor 12 is coupled to a source 13 through a multiplier 14 which maintains the synchronous motor 12 at a selected multiple of the frequency of the source 13. The principal operative elements of the rotary head assembly include a half dark and half white timing disk 16 and a rotating head assembly 17 having four magnetic heads 18 disposed symmetrically about its outer periphery for sequential engagement with the magnetic tape 10. A concave guide 20 having vacuum apertures (not shown) in its surface cups the tape around the rotary disk 17 and the path of movement of the heads 18.

Positioned along the path of the tape 10 subsequent to its travel past the rotary head disk 17, is mounted an erase head assembly containing separate erase heads 21, 22 in registry with opposite edges of the tape 10. Next subsequent to the erase head structure is another magnetic head structure which contains a control track recording head 24 and an audio recording head 25 disposed in registry with the marginal regions of the tape 10. The tape 10 is drawn past these various head assemblies by a capstan 27 which bears against an idler 28 to drive the tape 10 under control of a capstan drive motor 29 which may be controlled in speed.

During a recording operation, the same signals are provided to each of the heads 18 on the rotary disk 17, and the synchronous motor 12 continuously rotates, with the cupped tape 10 in intimate and closely controlled engagement with the heads 18. To this end, the position of the concave guide 20 may be varied so as to obtain the desired substantially constant pressure. During recording, therefore, the rotary heads 18 sweep out transverse tracks across the tape 10, the tracks being inclined at a slight angle as determined by the speed at which the capstan 27 drives the tape longitudinally. Concurrently, the edges of the tape 10 are erased by the erase heads 21, 22 and a timing control signal and audio signals are recorded by the control track recording head 24 and the audio recording head 25, respectively. The timing control signals are derived from a light responsive circuit which is optically coupled to the timing disk 16 so that the timing control signals are synchronized with the rotation of the shaft 12 and hence the position of the disk 17 and the heads 18. A light source 31 positioned adjacent the timing disk 13 illuminates the alternately light and dark (indicated by cross-hatched lines) halves of the disk 16, and the light reflected therefrom is caused to fall on a photoelectric device 32 which provides a square wave signal to drive and control track circuits 34 which are described in greater detail in the above-identified patent and application.

During a recording operation, the heads 18 are swept transversely past the tape 10 as the tape 10 is driven by the capstan 27. The timing disk 16 rotates in synchronism with the heads 18, so that the square wave pulses generated by the photoelectric device 32 are representative of any timing variations which occur in the speed of the motor 12. The timing pulses applied from the drive and control track circuits 34 to the control track recording head 24 cause a pattern of signals to be recorded on the margin of the tape 10, these patterns thus being similar to sprocket holes.

During the recording operation, the same continuous signal is supplied to each of the heads 18, although only the heads which are in contact with the tape 10 actually record. Because of the curvature of the tape 10 by the guide 20, and because of the width of the tape 10, the signals recorded at the end of one track and at the start of the next are duplicated and hence redundant. The period of the redundancy is used for switching between the heads during reproduction.

Input signals to be provided to this system may be applied to an input terminal in the form of continuous video signals having a selected line or horizontal synchronization frequency and containing vertical synchronization pulses. For the usual television standards the line frequency will be 15,750 cycles per second. For best recording, a wave bearing the video signals as frequency modulation is produced by a modulator 35. The frequency modulated wave passes through a switcher 36 and recording amplifiers 38 (not shown in detail) and is applied to a rotary contact device 40 which is coupled to each of the recording heads 18. The rotary contact device 40 includes a number of contact elements, such as brushes, and a number of contact rings, each of which is in contact with a different one of the brushes and electrically coupled to a different one of the heads. During recording, as mentioned above, the frequency modulated wave is applied to each of the heads 18 concurrently.

During reproduction, however, the signals derived by each of the heads 18 are separately amplified in preamplifiers (not shown in detail) within the amplifiers 38 and applied separately through different variable resistors 37 to the switcher 36. As described in the above identified application, the switcher 36 successively derives signals from the different ones of the heads 18, so as to form a substantially continuous frequency modulated wave corresponding to the wave originally recorded. A blanking switcher 42 coupled to the switcher 36 operates to accomplish switching between the heads 18 during redundant intervals in the signal information. The continuous frequency modulated wave from the switcher 36 is applied to a demodulator 43 from which a substantially continuous video output signal is obtained which is applied to a processing amplifier 44. Thus, a signal appears at the output of the processing amplifier 44 corresponding to the original video input signal.

Correct timing relationships are maintained during signal reproduction, through use of the control track signals which are derived from the tape by the control track head 24 and the timing signals which are derived by the photoelectric device 32. Both of these signals are applied to the drive and control track circuits 34, which controls the rotational speed of the capstan drive motor 29 so as to maintain the longitudinal movement of the tape 10 at a speed which synchronizes the recorded pattern to the actual speed of the motor 12 and the heads 18. In addition, the drive and control track circuits 34 may alter the position of the concave guide 20 so as to vary the transverse width of the tape and achieve precise adjustment between the heads 18 and each individual transverse track on the tape 10.

The above described recording and reproduction system operates with extremely high precision and accuracy to record video or other signals over a wide frequency band, and to reproduce the recorded signals without the introduction of errors which might be small but which could nevertheless be readily detected by the eye. In the reproduction of the signals, however, there may be some variations in the characteristics of the heads 18, or some differences in the gain or operation of the pre-amplifiers, so that the signal provided from the switcher 36 may be subject to a discontinuous variation as the different heads are used successively to provide output signals. The variations may take the form of the waveforms of FIGURE 2A, in which the frequency modulated signals provided successively from the heads are shown in greatly exaggerated scale.

It is therefore desirable to be able to provide a simple continuous display of the reproduced signals which accurately represents the amplitudes of the signals in each of the signal channels. Considerable difficulty is found, however, because of the fact that the frequency modulated wave derived from the heads is within the radio frequency spectrum so that the curve may tend to generate transients and disturbances in the control panel. Furthermore, severe problems are encountered in the display of radio frequency signals. In order to overcome the problems of transient disturbances and of display the present invention operates cooperatively with the rotary head assembly in the manner described below.

A signal conversion system in accordance with the present invention which is compatible with existing tape recording systems may operate to provide a stabilized display of signals corresponding to the response characteristics of each system channel. In this purpose, the frequency modulated wave from the switcher 36 is applied to an R.-F. amplifier 50 which is coupled to a B+ supply 48. The R.-F. amplifier 50 operates to apply signals to a pair of diodes 51, 52 functioning as a voltage doubler rectifying circuit. An amplitude detector circuit including a parallel capacitor 54 and resistor 55 connected in series with another resistor 56 provides a D.-C. output signal which is proportional to the amplitude of the instantaneous value of the wave derived from the switcher 36. At a junction point 58 subsequent to the detector circuit, therefore, the D.-C. signal which appears represents the successive signals derived from the different signal channels of the rotary head recording system.

The D.-C. signal appearing at the junction 58 is "chopped" by being clamped to a junction point of a ground or common potential during alternate half cycles of a periodic signal for the purpose of inserting a line frequency synchronizing signal component into the D.-C. signal. The clamping action is generated under control of an astable multivibrator 60 or other periodic source. Preferably, in accordance with the present invention, the astable multivibrator 60 is locked in synchronism with the line frequency signal component of 15,750 c.p.s. as derived from the reproduced wave by the demodulator 43. Although other periodic sources could be used, the astable multivibrator is preferred because of the square wave signal which it generates. The clamping action under control of the astable multivibrator 60 is further carried out by phase splitter and clamping diode circuits coupled to the junction 58. The phase splitter circuit includes an electron tube 61 having a load resistor 63 coupled to the B+ supply 48, and a cathode resistor 64 coupled to ground.

Signals of opposite phase are concurrently provided by symmetrical couplings to the anode and cathode of the electron tube 61. Coupling capacitors 66, 68 and resistors 67, 69 are arranged in a phase splitter circuit and are selected to be substantially equal in value in the present example. Accordingly, the signals at the junctions between the capacitor-resistor combinations 66, 67 and 68, 69 respectively constitute terminals at which square wave signals of opposite phase appear. These terminals are coupled to the circuit junction point 58 through oppositely poled diodes 70, 71 respectively.

The signal appearing at the junction 58 is subsequently amplified in an output amplifier including a pair of amplifier tubes 74, 75 respectively, each of which is arranged with their associated elements to amplify the signal in well known fashion. Output signals taken from the amplifiers 74 and 75 are applied to the amplitude control of a signal display device which may comprise a conventional cathode ray tube monitor or oscilloscope. The signal display device 77 may form part of the control panel for the rotary head recording system previously described. For horizontal sync control, a signal generated in the switcher of 240 c.p.s. is used.

As a frequency modulated wave is derived from the switcher 36, a D.-C. signal is generated at the circuit junction 58 through the action of the voltage doubler diodes 51, 52 and the associated detector circuit elements 54, 55 and 56. This D.-C. signal is made up of signal sequences from each of the heads 18 and their associated pre-amplifiers, so that the D.-C. signal varies in amplitude in accordance with the characteristics of the different heads. The 15,750 c.p.s. frequency signal from the multivibrator 60 reduces the potential of the junction 58 to a selected level during alternate half cycles of the 15,750 c.p.s. square wave. In the present example a negative signal appears at the circuit junction 58 through the operation of the voltage doubler circuit. During the half cycle in which the negatively poled diode 70 has a negative-going signal applied to its cathode, and the positively poled diode 71 has a positive-going signal applied to its anode, the potential of the circuit junction 58 is at a fixed reference level, thereby over-riding the signal appearing through the operation of the detector. During the alternate half cycle, the signals applied to the diodes 70, 71 from the phase splitter are effectively blocked by the diodes 70, 71 so that the voltage level of the circuit junction 58 is determined by the signal passed by the resistor 56.

Accordingly, during alternate half cycles a synchronizing signal component is inserted at the circuit junction 58 at a 15,750 c.p.s. line frequency rate. These signals are then amplified in the two output amplifier tubes 74, 75 and applied to the signal display device 77. At the signal display device 77, the horizontal sweep may be locked to the 15,750 c.p.s. frequency synchronizing component and the D.-C. signal may be displayed. With the above described arrangement, the display is stable and does not tend to drift across the display device with time. Furthermore, the D.-C. signal from the amplifiers 74 and 75 may be carried any reasonable distance to a control panel and amplified without the generation of R.-F. transients.

The waveforms displayed on the signal display device 77 appear as shown generally on FIGURE 2B. For each of the frequency modulated signals of initially different amplitude derived in the signal channels from the heads there is provided a periodically varying signal of corresponding maximum amplitude. The different maximum amplitudes provide a measure of how the resistors 37 should be adjusted (or the heads or amplifiers should be adjusted) to get equal signal contributions in each channel. Note that the presence and nature of vertical sync pulses in the video information is also provided for examination (in connection with the signal from head 4 in this example). Detailed analysis and control of the signals from the separate heads is thus possible.

While there has been described above and illustrated in the drawing exemplary circuits for permitting a display of the relative amplitudes of frequency modulated waves derived from several separate signal channels. It will be appreciated that the invention is not limited to the particular arrangements shown. Accordingly, the invention should be considered to include all modifications, variations, or alternative arrangements falling within the scope of the appended claims.

What is claimed is:

1. A circuit means for permitting display of the relative amplitudes of sequentially appearing segments of a frequency modulated wave, the circuit means including in combination a detector circuit coupled to a source of said wave for providing a rectified signal corresponding to the amplitude of the wave, the detector circuit including an output terminal, means coupled to the output terminal for inserting synchronizing signal components into the rectified signal, and a display device coupled to the output terminal for creating a visual display of said rectified signal along scanning lines determined by the synchronizing signal components.

2. A circuit means for converting R.-F. signals to signals which may be used to operate a display means without creating R.-F. transients, the circuit means including the combination of an input amplifier circuit coupled to a source of the R.-F. signals, a voltage doubling rectifier circuit coupled to the input amplifier, a detector circuit coupled to the voltage doubling rectifier and including an output circuit junction point, a free-running multivibrator locked to a selected frequency, a phase-splitter circuit coupled to the free-running multivibrator, a pair of parallel coupled diodes coupled to the phase-splitter circuit and to the output circuit junction point of the detector circuit for clamping the output circuit junction point to a selected potential on alternate half cycles of the frequency of the free-running multivibrator, and an output amplifier circuit coupled to the output circuit junction point of the detector circuit for providing an output signal suitable for application to a display device.

3. A circuit means for providing a signal suitable for display purposes which is representative of the amplitude of a wave bearing video information as frequency modulation, said video information being divided into scanning lines at a selected frequency, the circuit means including means coupled to a source of the frequency modulated wave for providing a rectified, detected signal therefrom representing the amplitude of the wave substantially free of frequency modulation components, means coupled to the means for providing a rectified, detected signal for inserting a synchronizing signal component into the rectified, detected signal as said selected line frequency, and a display device coupled to said means for inserting a synchronizing signal component into said rectified, detected signal for providing a visual representation of the amplitude of said frequency modulated wave.

4. A system for deriving control signals suitable for application to a display control panel from FM radio frequency signals provided from separate R.-F. signal portions occurring sequentially in time which are united to form a substantially continuous signal, the system including the combination of means coupled to a source of substantially continuous signal for providing a D.-C. signal therefrom, means for inserting a reference voltage potential into the D.-C. signal with a controlled periodicity, and means for applying the signal including the periodically inserted reference voltage to an associated display apparatus.

5. In a magnetic tape recording apparatus of the type which employs a plurality of transducer units mounted on a rotary assembly to successively sweep across a magnetic tape having recorded thereon sginal information in the form of transverse longitudinally spaced tracks, the heads being connected through a plurality of individual channels to a switching means which forms a continuous signal, a signal conversion circuit means for deriving a signal suitable for actuation of a display without the generation of transients, the signal conversion circuit means including the combination of a rectifier circuit connected to receive the continuous signal, a detector coupled to the rectifier circuit and responsive to the rectified signals therefrom, a periodic clamping circuit coupled to the detector circuit and operating to produce a synchronizing signal component in the detected signals, and means responsive to the rectified signals and the synchronizing signal component for providing a visual display of the amplitudes of each of the signals from the different signal channels from the heads.

6. In a magnetic tape recording system in which a plurality of separate magnetic transducer heads are employed for sequentially deriving recorded signals in the form of frequency modulated waves bearing video signal information comprising individual scanning lines appearing at a predetermined line scanning frequency and in which signals derived from each of the plurality of magnetic transducer heads are combined to produce a substantially continuous frequency modulated wave bearing said video information, the combination of means coupled to a source of said substantially continuous frequency modulated wave for providing a rectified signal corresponding to the amplitude of the individual waves derived by each of said magnetic transducer heads substantially free of frequency modulation components, reference voltage clamping means coupled to the output of said rectified signal providing means for inserting components into said rectified signal at a rate corresponding to said line scanning rate, and a display device coupled to said rectified signal providing means and responsive to said rectified signal and said inserted signal components for displaying said rectified signal along scanning lines whereby differences in amplitude between the signals derived from said magnetic transducer heads may be visually recognized.

7. In a magnetic tape recording system in which a recorded signal is derived by means of sequentially operable magnetic transducer heads subject to differing characteristics, means for creating a visual display of said differing characteristics substantially free of other signal components, including the combination of means coupled to said magnetic transducer heads for rectifying signals derived from each of said heads as said heads are rendered operable in time sequence to produce a rectified signal corresponding to the amplitude of the individual signals derived by each of said heads, means coupled to said rectified signal providing means for inserting periodically varying signal components into said rectified signal, and a display means coupled to said rectified signal providing means and responsive to said inserted components for producing a visual display of said rectified signals substantially free of other signal components whereby the differing characteristics of the heads may be determined by a visual inspection of the display.

References Cited in the file of this patent

UNITED STATES PATENTS

| | | |
|---|---|---|
| 2,485,343 | Zuschlag | Oct. 18, 1949 |
| 2,878,450 | Raiber | Mar. 17, 1959 |
| 2,979,558 | Leyton | Apr. 11, 1961 |